3,397,957
PROCESS OF CONVERTING SODIUM SULFATE TO SODIUM SULFITE, PARTICULARLY FOR PULPING PROCESSES
George R. Smithson, Grove City, and John E. Hanway, Jr., Columbus, Ohio, assignors, by mesne assignments, to Container Corporation of America, Chicago, Ill., a corporation of Delaware
Filed May 27, 1965, Ser. No. 459,239
6 Claims. (Cl. 23—129)

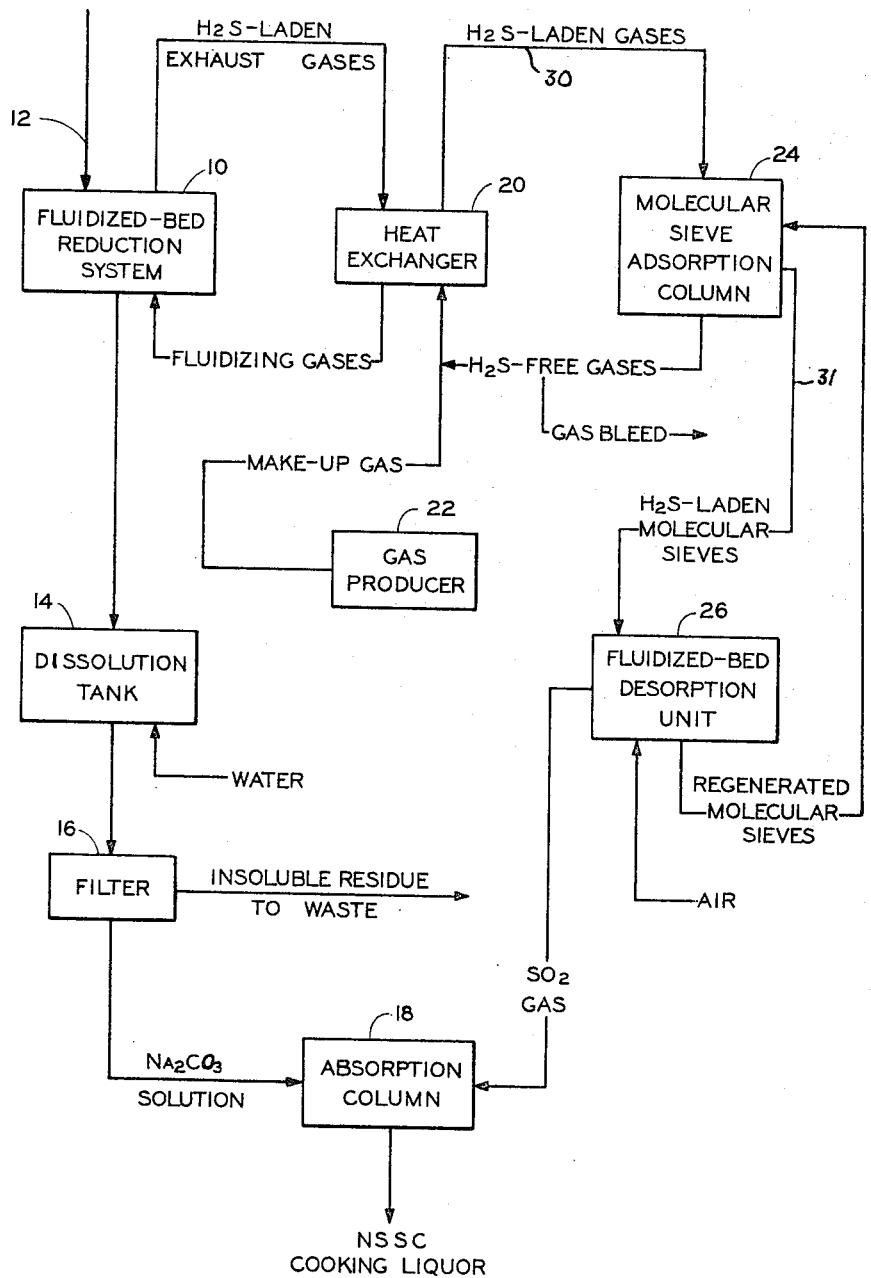

ABSTRACT OF THE DISCLOSURE

Disclosed is a process for converting sodium sulfate, such as from wood pulping, to sodium carbonate and hydrogen sulfide by a fluidized bed reduction, the adsorption of the hydrogen sulfide on a molecular sieve, the fluidized bed oxidation of the hydrogen sulfide on the molecular sieve to sulfur dioxide, and the reaction of the sulfur dioxide with aqueous sodium carbonate to form sodium sulfite cooking liquor.

---

This invention relates to improvements in sulfite wood pulping and relates in particular to new and novel ways for recovering chemicals from sulfite pulping wastes.

In the manufacture of pulp from wood and related raw materials for use in paper and similar industries, lignin and other organic and noncellulosic compounds are extracted from the cellulose components of pulp raw materials by cooking or digestion with liquids generally called cooking liquors. Such cooking liquors are composed of various chemical compounds depending upon the qualities desired in the resulting pulp and on the nature of the raw material used for pulping. Primarily employed for sodium base sulfite wood pulping are sodium sulfide and sodium bisulfite. Frequently used in combination with sodium base sulfite pulping liquors is sodium carbonate. The exact combination of chemicals and their strength employed is dependent upon the sulfite pulping system involved.

In copending patent application Ser. No. 210,305 filed July 12, 1962 entitled "Treatment of Waste Liquor," and now abandoned, there is described a new and improved method for treating waste liquors including sodium base sulfite waste liquors. This treatment is essentially the following:

(a) The sodium base waste liquors are concentrated by evaporation until the solid portion is within the range of approximately 20 to 45 percent;

(b) The concentrated waste is then introduced into the freeboard area of a fluidized bed;

(c) The fluidized bed is advisably maintained at a temperature range of approximately 1000–1400° F. and by introducing the liquor in the form of a spray the liquid portion evaporates, the organic portion burns, and the chemicals agglomerate to form fluidized-bed particles or deposit on existing fluidized-bed particles to become part of the fluidized bed; and (d) The agglomerated particles of the desired chemicals are obtained from the fluidized bed itself while the products of combustion are discharged in gaseous form.

Although the use of the aforementioned process employing sodium base liquor effects a recovery of the sulfur and sodium constituents from the pulping waste in a particularly efficient manner, the resultant product consists essentially of sodium sulfate or a mixture of sodium sulfate and sodium carbonate depending on the composition of the waste liquor employed. Sodium sulfate is obtained from bisulfite sodium base waste liquors while neutral sulfite liquors give a mixture of sodium sulfate and sodium carbonate. The carbonate is particularly useful in that it is readily converted into sulfite or bisulfite for making up new pulping liquor. Additionally, sodium carbonate is useful as a constituent of neutral sulfite pulping chemicals. The sulfate, however, is not useful in sulfite pulping processes and must be converted to a different form to be useful in sulfite pulping.

We have discovered that the sodium sulfate or sodium sulfate-sodium carbonate mixture obtained from the aforementioned process can be converted to sodium carbonate in a fluidized bed operating under reducing conditions. In this process, the sulfur is liberated as hydrogen sulfide.

We have also discovered a particularly useful and novel process for obtaining sulfur dioxide from the liberated hydrogen sulfide. In our process the hydrogen sulfide-containing gases from the fluidized-bed reduction reaction are advisably passed through a column of particulate molecular sieves that are disposed to selectively adsorb the hydrogen sulfide gas. These sieves can then be conveyed into an oxidizing fluidized bed where the hydrogen sulfide is oxidized to sulfur dioxide. The sulfur dioxide evolved from the sieves then can be reacted with an aqueous slurry of the sodium carbonate obtained from the conversion of the sodium sulfate or mixtures of sodium sulfate and sodium carbonate to substantially all sodium carbonate in the above-mentioned reducing fluidized-bed treatment.

Accordingly, it is an object of the present invention to provide a method for recovering chemicals from the waste liquor of sodium base sulfite wood pulping processes.

Another object of the present invention is to provide a method whereby the sodium sulfate content obtained from burning sodium base sulfite pulping liquors in an oxidizing fluidized bed are subsequently exposed to a reducing fluidized bed disposed to convert the sodium sulfate to sodium carbonate and liberate hydrogen sulfide gas.

Another object of the present invention is to provide an improved method for recovering hydrogen sulfide from hydrogen sulfide-containing gases.

A still further object of the present invention is to provide a means for recovering hydrogen sulfide gas evolved from chemical processes, and particularly sodium base sulfite wood pulping chemical recovery processes, wherein the hydrogen sulfide is adsorbed by a molecular sieve and then is converted to sulfur dioxide by exposing the molecular sieve to oxidizing conditions.

In general, the present invention relates to an improved method for recovering chemicals used in sodium base sulfite wood pulping waste operations. The starting materials used herein are sodium sulfate or sodium sulfate in admixture with sodium carbonate. These starting materials can be obtained from sodium base sulfite pulping liquors by a number of means. However, the most suitable source is from oxidation of the liquors in a fluidized bed so that the organic content oxidizes or combusts and the sulfur and sodium base materials agglomerate or form a deposit upon the fluidized-bed particles in the form of sodium sulfate with or without sodium carbonate.

According to the present invention, sodium sulfate with or without sodium carbonate is first subjected to a fluidized-bed treatment which is reducing in character and which is disposed to reduce the sulfate content to carbonate and with liberation of sulfur in the form of hydrogen sulfide in the effluent gases. The hydrogen sulfide so formed is then advisably adsorbed by a molecular sieve. The hydrogen sulfide-containing molecular sieve, if advisable, can then be fluidized under oxidizing conditions to convert the hydrogen sulfide gas to sulfur dioxide. The sulfur dioxide can then be reacted with the aforementioned sodium carbonate to reform sodium sulfite or sodium bisulfite for repulping use.

Relating our method to sodium sulfite recovery from sodium sulfite pulping processes, such as sulfite recovery from NSSC (neutral sulfite semi-chemical) wood pulping waste, we utilize the following reactions to convert sodium sulfate to sodium sulfite:

$$Na_2SO_4 + 4H_2 + CO_2 \rightleftharpoons Na_2CO_3 + 3H_2O + H_2S$$

$$H_2S + 3/2O_2 \rightleftharpoons H_2O + SO_2$$

$$Na_2CO_3 + SO_2 \rightleftharpoons Na_2SO_3 + CO_2$$

Our invention is best described by reference to the accompanying drawing which is a flow sheet that illustrates the conversion of mixed sodium sulfate and sodium carbonate pellets obtained from the fluidized bed oxidation of NSSC process pulping wastes to substantially all sodium carbonate.

In this flow sheet the mixed sodium sulfate and sodium carbonate pellets are introduced by conduit 12 into reactor 10 to provide a fluidized bed therein. The fluidized bed of particles in reactor 10 is suspended in a fluidizing preheated stream of gas having a reducing potential for converting sodium sulfate to sodium carbonate, such as mixtures of carbon dioxide with hydrogen, carbon monoxide, or methane. Under such reducing conditions the fluidized pellets are converted to substantially all sodium carbonate which is then conveyed to tank 14 where the sodium carbonate is dissolved in water. The solution of sodium carbonate and water is filtered at 16 to remove any insoluble constituents and then conveyed to an absorption column 18 where the sodium carbonate is reacted with sulfur dioxide gas to form sodium sulfite (or sodium bisulfite) for subsequent cooking liquor make-up.

The exhaust gases from the fluidized-bed reactor 10 contain the sulfur as hydrogen sulfide from the sodium sulfate pellets along with excess carbon dioxide and other fluidizing gases. These gases are conveyed to heat exchanger 20 where the sensible heat is extracted and utilized to preheat recycled fluidizing gas and reducing gas from gas producer 22.

The hydrogen-sulfide laden gases are then conveyed by conduit 30 to molecular sieve adsorption column 24 where the hydrogen sulfide gas is selectively adsorbed and the hydrogen sulfide free gases are either discharged or returned to heat exchanger 20 for re-use as a fluidizing gas in reactor 10.

The hydrogen sulfide laden molecular sieve is conveyed by conduit 31 to fluidized-bed reactor 26 and these fluidized by means of an oxidizing fluidizing gas which can conveniently be air. The hydrogen sulfide content of the molecular sieve is converted to sulfur dioxide in reactor 26.

The sulfur dioxide is then conveyed to absorption chamber column 18 to be reacted with the aqueous sodium carbonate solution from filter 16 to prepare cooking liquor make-up. The regenerated molecular sieve is returned to the absorption column 24 for re-use.

The fluidized beds within reactors 10 and 26 are composed of particles within the usual range of particle sizes of from about −8 to +325 mesh, and advisably 10 to 65 mesh (Tyler screen). The particles within bed 10 advisably consist of the sodium sulfate or sodium sulfate-sodium carbonate mixture pellets obtained from the spraying of concentrated sulfite wastes into the freeboard area of an oxidizing fluidized bed which is the subject of copending application Ser. No. 210,305 filed July 12, 1962, and now abandoned. However, the particles can be obtained from other sources.

The particles within the reactor 26 are composed of the particulate molecular sieves from adsorption column 24.

The fluidizing gas made up in gas producer 22 and employed to fluidize the bed within reactor 10 must, of course, be reducing. This gas should additionally contain carbon dioxide to convert the sulfates to carbonates. If insufficient carbon dioxide gases are included the resulting product may consist largely of sodium sulfide. Preferably, the reducing gas will contain at least about 10 percent by weight $CO_2$. The exact proportions of carbon dioxide and reducing gases to be employed is not critical and may be readily ascertained by one skilled in the art.

The bed within reactor 10 is advisably maintained within the temperature range of from about 1125° F. to 1350° F. However, a temperature of about 1250° F. is preferred.

The reaction temperature within the fluidized bed of reactor 26 is advisably maintained at about 650° F. to 850° F. However, the preferred temperature is about 750° F.

Molecular sieves are well-known for their ability to selectively adsorb hydrogen sulfide gas. Such sieves are used in the petroleum industry for the adsorption of hydrogen sulfide from sour gas. Conventionally, the sulfur is recovered from the molecular sieves as elemental sulfur by passing sulfur dioxide through a static column of the hydrogen sulfide-laden sieves. Recovery by this manner requires the additional step of oxidizing the elemental sulfur to form sulfur dioxide. The combination of in situ oxidation of the sulfur and regeneration of the sieves in a single fluidized-bed operation eliminates the need for a sulfur burner and takes advantage of the characteristics of close control of both temperature and atmosphere which are inherent in fluidized-bed operations. We have found that an amount of hydrogen sulfide equivalent to 5 to 10 percent of the weight of the molecular sieves is adsorbed from a gaseous mixture of hydrogen and hydrogen sulfide. Quantitative removal of the hydrogen sulfide is obtained until eventual breakthrough occurs as the maximum adsorptive capacity of the sieves is reached. Adsorbed hydrogen sulfide on the sieves is oxidized to form sulfur dioxide and about 96 to 97 percent of the sulfur dioxide so formed can be recovered in an aqueous sodium carbonate solution in the form of sodium sulfite.

Suitable molecular sieves that can be used are synthetic zeolites, or sodium aluminosilicates, whose porous structure is such that molecules of hydrogen sulfide can be adsorbed and held thereon under a given set of conditions while molecules of other compounds pass through the sieve. Adsorption of gaseous molecules by molecular sieves depends on several factors among which are the size and the polar or nonpolar nature of the molecule. Different types of molecular sieves have different pore diameters and varying affinities for particular compounds.

We have found two types of molecular sodium aluminosilicate sieves manufactured by the Linde Air Products Company known as Linde Types 4A and 5A to be particularly useful when employed in conjunction with the methods of the present invention. The forms of the sieves may be varied with Type 5A being cylindrical and Type 4A being either spherical or granular. The particle size of the sieves also may be varied from 12 x 35 mesh to 8 x 12 mesh.

EXAMPLE 1

In the following examples, the percentages of gases in the gas mixtures are on a volume basis while the percentages for solids are on a weight basis.

As an illustration of the method of the present invention, experiments were performed using a 4½ inch diameter fluidized-bed unit. Pellets from fluidized-bed operations wherein concentrated sulfite pulping waste were sprayed into the freeboard space of a fluidized bed under oxidizing conditions were fluidized in a reducing atmosphere. The pellets, which consisted of a mixture of $Na_2SO_4$ and $Na_2CO_3$, assayed 15.3 percent sulfur and 13.7 percent $CO_2$. These pellets were reduced in a reducing fluidized bed for a conversion of the sulfate content to carbonate of about 80 to 85 percent. The conditions used to obtain this conversion were a temperature of about 1250° F., a fluidizing-gas mixture of 62 percent $N_2$, 25 percent of $H_2$ and 13 percent of $CO_2$ and retention time within the fluidized bed was about 24 to 36 hours.

To demonstrate the feasibility of selectively adsorbing the $H_2S$ laden gases on molecular sieves and oxidizing the $H_2S$ to $SO_2$ on such sieves, a column of sodium aluminosilicate molecular sieve was loaded with $H_2S$, obtained from the fluidized-bed reduction vessel, after which the loaded sieve was fed into a fluidized bed which was being operated at about 750° F. under oxidizing conditions using air as the fluidizing gas. The effluent gases were passed through an aqueous solution of sodium carbonate to collect the sulfur dioxide so formed. The results shown in Table 1 below indicate that about 96 to 97 percent of the total sulfur reacted with the sodium carbonate and was present as sodium sulfite, thus indicating the efficient conversion of hydrogen sulfide to sulfur dioxide.

TABLE 1.—RECOVERY OF OXIDIZED SULFUR COMPOUNDS FROM MOLECULAR SIEVE BY ADSORPTION IN $Na_2CO_3$ SOLUTION

| Run | Chemical Analysis of Solution, g./l | | | Percentage of Sulfur Present in S Solution as Sulfite |
|---|---|---|---|---|
| | Sulfate S | Sulfite S | Sulfide S | |
| 1 | 0.23 | 8.54 | Trace | 97 |
| 2 | 0.14 | 3.55 | Nil | 96 |

EXAMPLE 2

As a further illustration of the workability of the method of the present invention experiments were conducted in a 4½ inch diameter stainless steel fluidized-bed unit. The fluidized-bed unit was enclosed in an electrically heated furnace to provide the heat requirements for processing. Fluidizing gases were preheated to the desired temperature in an auxiliary electrically heated preheater. The fluidized-bed system was operated both in a batchwise and in a continuous manner and provisions were made to feed calcine pellets into the unit and to discharge the converted product from the unit. Exhaust gases were vented from the top of the fluidized-bed unit.

Spheroidized calcined pellets of $-10$ mesh size and which contained 67 percent sodium sulfate and 33 percent sodium carbonate were introduced into the aforementioned unit and fluidized. The fluidizing gas consisted of a gaseous mixture of 25 percent of hydrogen, 13 percent of carbon dioxide and 62 percent of nitrogen. The fluidizing gas was maintained at a temperature of about 1250° F. In this specific test continuous feeding of calcine was not employed but samples were removed periodically and analyzed. Analysis indicated an initially rapid rate of increase in the percentage of sodium carbonate with the product containing about 68 percent of sodium carbonate at the end of 17 hours of treatment. Beyond this point, the rate of conversion decreased with a product containing about 75 percent of sodium carbonate being obtained at the end of a 31-hour period.

The aforementioned fluidized-bed unit was modified to include a gas recycle system. Calcined pellets (67 percent $Na_2SO_4$=33 percent $Na_2CO_3$) were fed continuously to this unit and the products were continuously withdrawn while varying the composition of the fluidizing gases, retention time and temperature. When the unit was operated at average temperatures of 1225° F. to 1250° F. at a feed rate of 75 grams per hour while utilizing the fluidizing gases set forth in Table 2 below, the sodium carbonate content of the product increased from 33 percent to 70 percent within 25 hours.

In another continuous run of the above-described apparatus the moisture content of the fluidizing gas was varied between 1½ and 7 percent by weight (fluidizing gas analysis dry basis: 28 percent $H_2$, 16 percent CO, 16 percent $CO_2$ and 40 percent $N_2$). During this run the sodium carbonate content was increased from about 33 percent by weight to products containing as much as 78 percent. It was also established that less than 7 percent water was preferred.

Still further tests were conducted in which methane was used as the sole make-up reductant. The 33 percent sodium carbonate material was converted into a product containing 79 percent sodium carbonate. Gas chromatographic analyses made during this run showed an average composition of fluidizing gas as 4 percent $H_2$, 18 percent CO, 19 percent $CO_2$, 42 percent methane and 19 percent $N_2$ (temperature of approximately 1250° F.). Pyrolysis of the methane and side reactions between various constituents of the fluidizing gases were responsible for the presence of hydrogen and carbon monoxide.

Analyses of some of the products prepared during the exprimentation on the reduction-carbonation technique are shown in Table 3 below. These analyses indicate that over 90 percent of the sulfate sulfur was reduced to a lower valence state in most of the tests shown in Table 3. The elimination of the reduced sulfur from the charge reached a maximum of 80 to 85 percent with 70 to 75 percent elimination of the sulfur being more common under the conditions of the experiments, i.e., bed temperature of 1250° F., an average retention time of about 30 hours, and gas composition of 28 percent $H_2$, 16 percent CO, 16 percent $CO_2$ and 40 percent $N_2$.

TABLE 3.—ANALYSES OF PRODUCTS FROM THE REDUCTION-CARBONATION TREATMENT

| Sample | Analysis, Percent | | | |
|---|---|---|---|---|
| | $Na_2CO_3$ | Sulfate S | Total S | Sulfide S |
| 28-9 | 78.3 | 1.48 | 5.58 | |
| 28-10 | 75.2 | 2.73 | 5.99 | |
| 32-3 | 66.1 | 3.55 | 7.62 | 2.66 |
| 35-P | 87.3 | 0.56 | 3.57 | 2.27 |
| 26-3 | 70.4 | 1.24 | 8.51 | |
| 20-8 | 72.8 | 1.72 | 6.18 | 2.78 |
| 30-5 | 79.9 | | | |

During the aforementioned tests wherein sodium sulfate was converted to sodium carbonate, a stream of exhaust gases bled from the reduction system was passed through columns of a sodium aluminosilicate molecular sieve (Linde Type 4A) to remove the hydrogen sulfide. Qualitative tests with lead acetate paper indicated that the removal of $H_2S$ by the sieve was complete. Chemical analyses showed that the $H_2S$-laden sieve contained from 0.7 to 1 percent of sulfur.

The $H_2S$-laden molecular sieve was introduced into a 1 inch diameter fluidized-bed unit. This unit was assembled in such a manner that small amounts of the $H_2S$-laden molecular sieve could be fed into the inlet gas stream and be carried into the fluidized bed of particulate molecular sieve. The fluidizing gas was air which caused oxidation of the $H_2S$ on the sieve and formation of sulfur dioxide. In all of these tests, the oxidation of the hydrogen sulfide to sulfur dioxide in the bed was carried out at a temperature of about 750° F.

The exhaust gases containing sulfur dioxide from the fluidized-bed unit were bubbled through an aqueous solution of sodium carbonate. These solutions were analyzed for sulfate, sulfite and sulfide sulfur to determine the conversion of the sulfur to sodium sulfite. The sulfite TABLE 2.—MASS SPECTROGRAPHIC ANALYSES OF GAS SAMPLES OBTAINED DURING THE OPERATION OF THE 4½ INCH DIAMETER FLUIDIZED-BED UNIT

| Description of Sample | Volume Percent of Component Indicated | | | | | | |
|---|---|---|---|---|---|---|---|
| | $CO_2$ | A | $H_2S$ | $O_2$ | CO | $N_2$ | $H_2$ |
| Inlet Gas | 9.83 | 0.16 | 0.05 | 0.47 | 21.9 | 45.7 | 21.9 |
| Exhaust Gas | 7.90 | 0.07 | 0.06 | 0.17 | 24.4 | 46.8 | 20.6 | sulfur content of the sodium carbonate solution accounted for from about 79 to 97 percent of the total sulfur present. Results are reported in Table 4 below.

TABLE 4.—RECOVERY OF SULFUR FROM MOLECULAR SIEVE BY OXIDATION IN FLUIDIZED BED

| Approximate Sulfur Content of Molecular Sieve, Percent [1] | Chemical Analysis of $Na_2CO_3$ Solution Used as $SO_2$ Adsorbent, g./l. | | | Percentage of Sulfur Present in Solution as Sulfite S |
|---|---|---|---|---|
| | Sulfate S | Sulfite S | Sulfide S | |
| 4.5 | 0.08 | 2.85 | Nil | 97 |
| 0.6 | 0.07 | 0.37 | 0.03 | 79 |
| 0.8 | 0.04 | 0.61 | 0.05 | 87 |
| 0.4 | 0.04 | 0.37 | 0.03 | 84 |

[1] Calculated from flow rates, gas compositions and time required for $H_2S$ breakthrough.

Various changes and modifications of the invention can be made and, to the extent that such variations incorporate the spirit of this invention, they are intended to be included within the scope of the appended claims.

What is claimed is:
1. A method for converting sodium sulfate to sodium sulfite comprising:
  (a) fluidizing particles of sodium sulfate-containing material with a reducing fluidizing gas that contains carbon dioxide;
  (b) maintaining said fluidized particles at a temperature disposed to convert said sodium sulfate to sodium carbonate;
  (c) passing the gases evolved during conversion of said sodium sulfate through a particulate molecular sieve disposed to adsorb $H_2S$ from said gases;
  (d) fluidizing said particulate molecular sieve in an oxidizing fluidizing gas to convert said $H_2S$ to $SO_2$;
  (e) collecting said $SO_2$ from the evolved gases from said fluidizing sieve; and
  (f) reacting said $SO_2$ with said so formed sodium carbonate, in aqueous solution, to form aqueous sodium sulfite.

2. The method of claim 1 wherein the temperature of said reducing fluidizing bed is maintained at from about 1125° F. to about 1350° F.

3. The method of claim 1 wherein said reducing fluidized gas contains at least about 10 percent of carbon dioxide.

4. The method of claim 1 wherein said oxidizing fluidizing bed is maintained at from about 650° F. to about 850° F.

5. A method for converting pellets that consist of a mixture of sodium sulfate and sodium carbonate to substantially all sodium sulfite comprising:
  (a) fluidizing said pellets with a reducing fluidizing gas that contains at least 10 percent by weight carbon dioxide while maintaining said bed at a temperature of from about 1125° F. to 1350° F. so as to convert at least a substantial portion of said sulfate content to carbonate;
  (b) dissolving the solid products of said reducing fluidization in water and filtering the insoluble residue therefrom, thereby forming an aqueous solution of sodium carbonate;
  (c) conducting the exhaust gases from said reducing fluidization reaction through a particulate molecular sieve disposed to adsorb the $H_2S$ gas therefrom;
  (d) fluidizing said molecular sieve particles with an oxidizing gas so as to oxidize said adsorbed $H_2S$ gas to $SO_2$; and
  (e) conducting the exhaust gases from said oxidizing fluidization through said aqueous solution of sodium carbonate to produce aqueous sodium sulfite.

6. The method of claim 5 wherein said exhaust gas from said reducing fluidized bed is first passed through a heat exchanger prior to being conducted through said molecular sieve, said heat exchanger being disposed to transfer at least a portion of the sensible heat from said exhaust gases to reducing gas fed through the heat exchanger prior to its fluidizing the pellets.

References Cited

UNITED STATES PATENTS

| 2,834,429 | 5/1958 | Kinsella et al. | 55—75 |
| 3,309,262 | 3/1967 | Copeland et al. | 23—48 X |
| 3,111,377 | 11/1963 | Mugg | 23—63 X |
| 3,144,307 | 8/1964 | Haines | 23—181 X |
| 3,186,789 | 6/1965 | Ward et al. | 23—181 X |

FOREIGN PATENTS 1,786   1873   Great Britain.

OSCAR R. VERTIZ, Primary Examiner.

G. T. OZAKI, Assistant Examiner.

UNITED STATES PATENT OFFICE
CERTIFICATE OF CORRECTION

Patent No. 3,397,957                                August 20, 1968

George R. Smithson et al.

It is certified that error appears in the above identified patent and that said Letters Patent are hereby corrected as shown below:

Column 3, line 49, "these" should read -- there --. Column 4, line 60, cancel "EXAMPLE 1" and insert the same after line 63, same column 4. Column 5, line 5, after "$H_2S$" insert -- gas from evolved $H_2S$ --; line 23, "S Solution as Sulfite" should read -- Solution as Sulfite S --; line 59 "=33" should read -- -33 --. Column 6, line 22, "exprimentation" should read -- experimentation --.

Signed and sealed this 13th day of January 1970.

(SEAL)
Attest:

Edward M. Fletcher, Jr.                       WILLIAM E. SCHUYLER, JR.
Attesting Officer                                 Commissioner of Patents